(12) United States Patent
Roussie

(10) Patent No.: US 7,845,687 B2
(45) Date of Patent: Dec. 7, 2010

(54) RESISTANCE TO FATIGUE OF A THREADED TUBULAR CONNECTION

(75) Inventor: Gabriel Roussie, Cappelle en Pevele (FR)

(73) Assignees: Vallourec Mannesmann Oil & Gas France, Aulnoye-Aymeries (FR); Sumitomo Metal Industries, Ltd, Osaka-shi (JP)

( * ) Notice: Subject to any disclaimer, the term of this patent is extended or adjusted under 35 U.S.C. 154(b) by 882 days.

(21) Appl. No.: 10/581,360

(22) PCT Filed: Dec. 2, 2004

(86) PCT No.: PCT/EP2004/013743

§ 371 (c)(1),
(2), (4) Date: Jun. 2, 2006

(87) PCT Pub. No.: WO2005/059422

PCT Pub. Date: Jun. 30, 2005

(65) Prior Publication Data

US 2008/0012321 A1 Jan. 17, 2008

(30) Foreign Application Priority Data

Dec. 11, 2003 (FR) .................................. 03 14527

(51) Int. Cl.
*F16L 25/00* (2006.01)
(52) U.S. Cl. ...................... 285/333; 285/334; 285/355; 285/390
(58) Field of Classification Search ......... 285/333–334, 285/355, 390
See application file for complete search history.

(56) References Cited

U.S. PATENT DOCUMENTS

| 3,109,672 | A | * | 11/1963 | Franz | 285/334 |
| 4,346,920 | A | * | 8/1982 | Dailey | 285/89 |
| 4,549,754 | A | | 10/1985 | Saunders et al. | |
| 4,610,467 | A | * | 9/1986 | Reimert | 285/24 |
| 4,799,844 | A | * | 1/1989 | Chuang | 411/414 |
| 4,865,364 | A | * | 9/1989 | Nobileau | 285/334 |
| 4,892,337 | A | | 1/1990 | Gunderson et al. | |
| 4,907,926 | A | * | 3/1990 | Wing | 411/366.3 |

(Continued)

FOREIGN PATENT DOCUMENTS

EP 0 713 952 5/1996

(Continued)

OTHER PUBLICATIONS

What Every Engineer Should Know; vol. 18 Threaded Fasteners Materials and Design, Alexander Blake Copyright 1986 by Marcel Dekker, Inc., p. 17.

(Continued)

*Primary Examiner*—Aaron Dunwoody
*Assistant Examiner*—Fannie Kee
(74) *Attorney, Agent, or Firm*—Oblon, Spivak, McClelland, Maier & Neustadt, L.L.P.

(57) ABSTRACT

A method to improve fatigue resistance of a threaded tubular connection. Radial interference between a male and female threading operates between stabbing flanks inclined at about 27° with respect to an axis of the threadings, wherein mutual contacting surfaces are radially spaced from a root of the male threading, which is defined by a concave rounded portion.

26 Claims, 3 Drawing Sheets

U.S. PATENT DOCUMENTS

| | | | |
|---|---|---|---|
| 4,943,094 A | | 7/1990 | Simmons |
| 4,943,095 A | * | 7/1990 | Sugimura .................. 285/334 |
| 5,127,784 A | * | 7/1992 | Eslinger ..................... 411/414 |
| 5,505,502 A | * | 4/1996 | Smith et al. ................. 285/334 |
| 5,829,797 A | * | 11/1998 | Yamamoto et al. .......... 285/333 |
| 6,729,658 B2 | | 5/2004 | Verdillon |
| 6,755,447 B2 | * | 6/2004 | Galle et al. ................. 285/390 |
| 2003/0038476 A1 | | 2/2003 | Galle, Jr. et al. |

FOREIGN PATENT DOCUMENTS

| | | |
|---|---|---|
| EP | 1 296 088 | 3/2003 |
| FR | 2 807 138 B1 | 10/2001 |
| GB | 777 901 | 6/1957 |
| WO | WO 84/04352 | 11/1994 |
| WO | WO 98/50720 | 11/1998 |
| WO | WO 01/75346 A1 | 10/2001 |

OTHER PUBLICATIONS

Fastener-Torque Model to Enhance Reliability Under Cyclic Load Joe Ganguly; Bendix Oceanics, Inc.; Sylmar 1992 Proceedings Annual Reliability and Maintainability Symposium pp. 196-201.

* cited by examiner

RESISTANCE TO FATIGUE OF A THREADED TUBULAR CONNECTION

FIELD OF THE INVENTION

The invention relates to a method for improving the fatigue resistance of a threaded tubular connection subjected to stress variations, said connection comprising a male tubular element including a tapered male threading, and a female tubular element including a tapered female threading which cooperates with the male threading by screwing to produce a rigid mutual connection of said tubular elements with radial interference between radial load transfer zones of said threadings.

That type of threaded connection is primarily intended for the production pipe strings for hydrocarbon or the like wells.

Said radial interference is primarily intended to prevent breakout of the threaded connections in service—which would be catastrophic—, and it also renders the threaded connection far more monolithic.

DISCUSSION OF THE BACKGROUND

Threaded connections of that type are known in which radial interference is obtained by contact between thread crest and corresponding thread root, in particular between the crest of the female thread and the root of the male thread.

Such contact zones between corresponding thread crests and roots then constitute radial load transfer zones for the threadings.

It has been established that, when such a threaded connection is subjected to stress variations, in addition to cracking by fatigue in stress concentration zones, for example at the foot of the load flank, micro-cracks appear in contact zones at the thread root, which tend to develop if high and variable tensile stresses exist in that zone, compromising the fatigue resistance of the connection.

Such phenomena primarily occur in rotary drillpipe strings and have required for such products threadings cut in very thick attached elements termed "tool joints" comprising triangular threads of great depth with rounded crests and roots. There is no contact between those thread roots and crests, nor in general any radial interference. Even if such interference were implemented, the radial loads would be transferred to the thread flanks where the tensile stresses are much lower than at the thread root. The load flanks which, it will be recalled, are the flanks directed towards the side opposite to the free end of the tubular element under consideration, make an angle of 60° with respect to the axis of the threaded connection. The stabbing flanks are disposed symmetrically, making the same angle with the axis.

These phenomena also occur in pipe strings connecting an offshore platform with the sea bed, under the action of waves, wind, tides and sea currents, which induce variable tensile or bending loads on the string.

SUMMARY OF THE INVENTION

However, with that type of connection, it is not always possible to produce threads with a large thread depth and triangular threads run the risk of disengaging or jumping out from the tubular elements in service in the well.

The invention aims to overcome these disadvantages.

The invention aims in particular at a method of the type defined in the introduction and provides that the threadings each have a load flank extending substantially perpendicular to the axis of the threadings, and provides that said radial load transfer zones are at a radial distance from the envelopes of the thread roots of the male and female threadings and form an angle of less than 40° with the axis of the threadings.

The term "envelope of the thread root" means the tapered surface which envelops the thread roots which is furthest from the thread crests.

Due to the radial separation of the radial load transfer zones with respect to the envelopes of the thread roots, the microcracks which can form therein are not affected by the tensile stresses existing in the material beyond the thread root envelope and thus do not deleteriously affect the fatigue resistance of the connection.

Optional characteristics of the invention, which may be complementary or substitutional, will be given below:

said radial load transfer zones are constituted by i) the crest of at least one helical protuberance formed on the thread root of at least one threading with respect to the envelope of the thread root and ii) the facing zone located on the thread crest of the corresponding threading;

the protuberance or protuberances is/are disposed on the male thread root;

the crest of the protuberances is convexly domed;

the protuberances are connected to the thread root via one or more concave rounded portions;

said protuberances are each constituted by the crest of a helical rib formed on the thread root of the threading under consideration;

said radial load transfer zones comprise the crests of at least two helical ribs which are in axial succession along the thread root of the male threading;

said radial load transfer zones comprise the crest of a boss extending from the foot of the load flank to the foot of the stabbing flank on the thread root of the threading under consideration;

said radial load transfer zones comprise the crest of a boss bearing on one of the flanks of the threading under consideration;

said facing zones located on the thread crest of the corresponding threading each have a recessed helix partially enveloping each protuberance;

said radial load transfer zones are constituted by respective intermediate regions of the stabbing flanks of the male and female threadings, said intermediate regions forming a smaller angle with the axis of the threadings than the neighbouring regions of said flanks;

the angle between said intermediate regions and the axis Of the threadings is substantially zero;

said radial load transfer zones are ramps constituting the stabbing flanks of the male and female threadings over the major portion of the radial height thereof;

the angle between said ramps and the axis of the threadings is in the range 20° to 40°;

the angle between said ramps and the axis of the threadings is about 27°;

the invention is implemented in a zone of full height threads termed perfect threads;

the invention is implemented both in a zone of perfect threads and in a zone of imperfect threads, in particular in a zone of run-out threads;

the profile of the male threading comprises a first concave rounded portion defining the thread root and tangential to said ramp;

the profile of the male threading comprises a second concave rounded portion with a smaller radius of curvature than the first rounded portion and tangential thereto and to the load flank;

a groove defining the female thread root extends axially from a first wall constituted by the load flank to a second wall which is connected to the ramp of the female threading;

the profile of said groove comprises a central concave rounded portion framed by first and second rounded concave portions respectively tangential to said first and second walls and with a smaller radius of curvature than the central rounded portion;

the profile of the female threading comprises a convex rounded portion tangential to a second rounded portion and to said ramp, the zone of inflexion between the convex rounded portion and the second rounded portion constituting the second wall.

The invention also relates to a threaded tubular connection for implementing the above-defined method, comprising a male tubular element including a tapered male threading, and a female tubular element including a tapered female threading which cooperates with the male threading by screwing to produce a rigid mutual connection of said tubular elements with radial interference between radial load transfer zones of said threadings.

The threaded connection comprises in accordance with the invention at least one of the following particularities:

said radial load transfer zones are constituted by i) the crest of at least one helical protuberance formed on the thread root of at least one threading with respect to the envelope of the thread root and ii) the facing zone located on the thread crest of the corresponding threading;

said radial load transfer zones comprise the crest of a boss extending from the foot of the load flank to the foot of the stabbing flank on the thread root of the threading under consideration;

said radial load transfer zones comprise the crest of a boss bearing on one of the flanks of the threading under consideration;

said radial load transfer zones are constituted by respective intermediate regions of the stabbing flanks of the male and female threadings, said intermediate regions forming a smaller angle with the axis of the threadings than the neighbouring regions of said flanks;

said radial load transfer zones are ramps constituting the stabbing flanks of the male and female threadings over the major portion of the radial height thereof, and the profile of the male threading comprises a first concave rounded portion defining the thread root and tangential to said ramp;

said radial load transfer zones are ramps constituting the stabbing flanks of the male and female threadings over the major portion of the radial height thereof, and a groove defining the female thread root extends axially from a first wall constituted by the load flank to a second wall which is connected to the ramp of the female threading.

BRIEF DESCRIPTION OF THE DRAWINGS

The characteristics and advantages of the invention will now be described in more detail in the following description made with reference to the accompanying drawings.

DETAILED DESCRIPTION OF THE PREFERRED EMBODIMENTS

Figure 1:
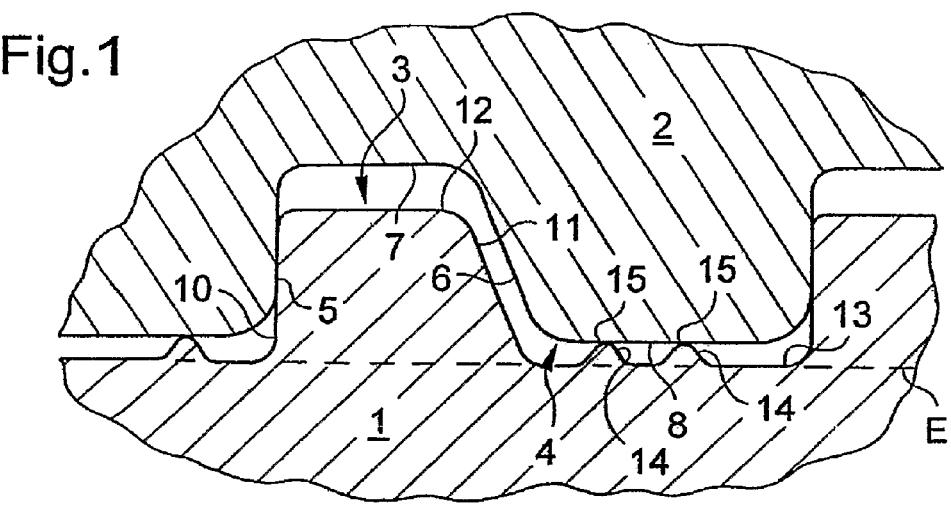
FIGS. 1 to 6 are partial views in axial cross section of the threadings of different tubular connections of the invention.

The threaded tubular connection shown in part in FIG. 1 comprises a male tubular element 1 and a female tubular element 2 respectively including a tapered male threading 3 and a tapered female threading 4. The female threading 4 has a conventional trapezoidal profile, defining a load flank 5 which extends substantially perpendicular to the axis of the threadings, i.e. vertically in the figure, the axis being horizontal, a stabbing flank 6 forming a different angle which is, however, close to 90° with the axis of the threadings, a thread root 7 and a thread crest 8 substantially parallel to the axis, the root 7 and crest 8 being connected to flanks 5 and 6 via rounded portions. The direction of the inclination of the flank 6 is such that the helical groove formed by the female threading shrinks in the direction of the root 7.

The profile of the female threads 4 can in particular correspond to a profile designated in the American Petroleum Institute's specification API 5CT as a "buttress" profile.

The "buttress" threading has a taper of 6.25% (1/16), 5 threads per inch of length, a load flank angle of +3° and a stabbing flank angle of +10°.

Other threadings, in particular derived from the "buttress" threading type, can be used.

The male threading 3 has a load flank 10, a stabbing flank 11 and a thread crest 12 located facing flanks 5 and 6 and the thread root 7 respectively and orientated in the same manner thereas, as well as a thread root 13 located facing the thread crest 8 and which extends parallel to the axis but which is interrupted by two helical ribs 14, the height of which with respect to the thread root 13 is advantageously in the range about 0.2 to 0.4 mm. The crest 12 and root 13 are connected to flanks 10 and 11 via rounded portions. The two ribs 14 with identical profiles and the same pitch as threadings 3 and 4 are offset with respect to each other in the axial direction to leave a fraction of flat bottom 13 between them, and two other fractions either side of the ribs. The ribs 14 have a rounded crest 15 defining a helical contact line between the rib and the female thread crest 8. They are also connected to the bottom of the male thread 13 via rounded portions.

Because of the disposition of the invention, when threadings 3 and 4 are made up one into the other so that load flanks 5, 10 bear on each other and a radial interference fit is obtained between the elements 1 and 2, the radial loads transferred between elements 1 and 2 are transferred via the contact lines 15 which are at a radial distance from the thread root 13, so that microcracks which may form there because of stress variations or slight relative movements cannot develop, the tensile stresses only existing beneath the threading roots inside the envelope E of the thread root 13 (i.e. below this envelope in FIG. 1).

It should be noted that after makeup, a radial clearance subsists between the crest of the male thread 12 and the root of the female thread 7. An axial clearance also subsists between the stabbing flanks 6, 11, which axial clearance should advantageously be minimized. The radial clearance between the male thread crest 12 and the female thread root 7 is in particular a function of the rounded portion between this thread root and the female load flank 5. The radius of curvature of this rounded portion should be maximized to limit stress concentrations which are deleterious to the fatigue resistance. This is the same for the rounded portion between the male load flank and the male thread root 13.

Figure 2:
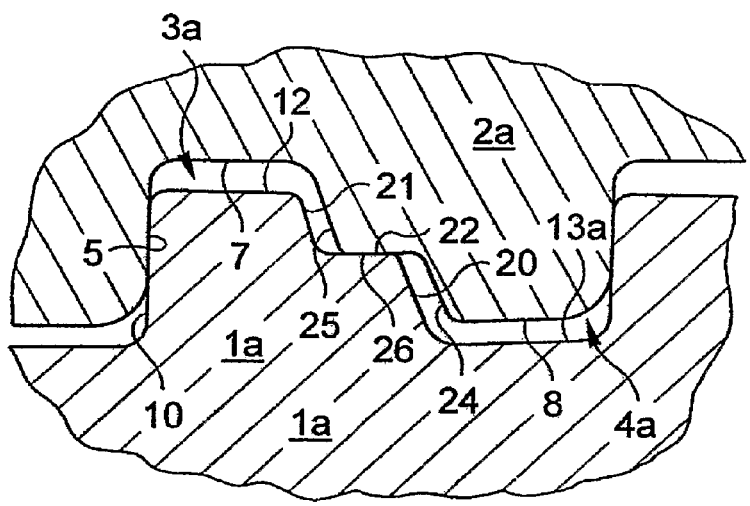

FIG. 2 shows part of a male tubular element 1a and a female tubular element 2a provided with respective threadings 3a and 4a. Reference numerals 5,7, 8,10 and 12 designate elements that were already described above with reference to FIG. 1 and will not be described again. In contrast to FIG. 1, the male thread root 13a extends continuously parallel to the axis of the threadings facing the female thread crest 8. The stabbing flank of the male threading is in three portions, namely a portion 20 having substantially the same inclination as flanks 6 and 11 of FIG. 1 and connecting via a rounded portion to root 13a, a portion 21 with the same inclination as portion 20, connecting via a rounded portion to the thread crest 12, and an intermediate portion 22 extending parallel to the axis and connecting to portions 20 and 21 via rounded portions. Similarly, the stabbing flank of the female threading comprises three portions, namely portions 24 and 25 with the same inclination as portions 20 and 21, located respectively facing them and connected via rounded portions to the thread crest 8 and to the thread root 7 respectively, and an axially extending intermediate portion 26 facing the portion 22 and connected to portions 24 and 25 via rounded portions. When the threadings 3a and 4a are made up one into the other to obtain radial interference, the radial loads are transferred via portions 22 and 26 of the stabbing flanks, which are radially distanced from the thread root 13a of the male threading and the envelope E of the male thread root, thus producing the effect described with reference to FIG. 1.

The above observations concerning the radial clearance between the male thread crest 12 and the female thread root 7, and the rounded portions between the load flanks and the thread roots are also applicable to the connection of FIG. 2. There is also an axial clearance between portions 21-25 and between portions 20-24 of the stabbing flanks.

Figure 3:
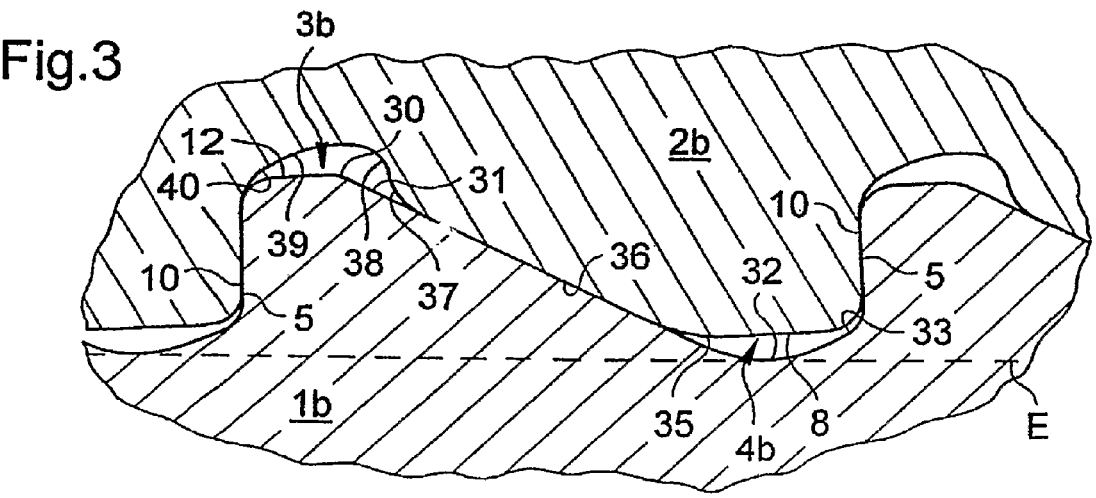

FIG. 3 partially shows a male tubular element 1b and a female tubular element 2b provided with respective threadings 3b, 4b. As with the embodiments described above, the load flanks 5, 10 of the female and male threadings extend substantially radially and their thread crests 8, 12 extend substantially axially. Regarding the thread roots and stabbing flanks, their profiles are defined by a combination of straight lines and rounded portions which is described below, the values for the radii of curvature being indicated by way of example for a tubular connection belonging to a pipe string with an external diameter of 177.8 to 339.73 mm (7" to 13" ⅜).

Opposite to the male load flank 10 perpendicular to the axis of the threaded connection, the rectilinear axial profile of the male thread crest 12 connects via a convex rounded portion 30 to the stabbing flank constituted by a straight line 31 which forms an angle of 27° with the axis and which moves away from the flank 5 in the direction of the axis. At the opposite end to the crest 12, segment 31 is tangential to a concave rounded portion 32 with a large radius of curvature, more than 1 mm, for example of the order of 1.5 mm, which defines the male thread root, a further concave rounded portion 33 with a radius of curvature of 0.3 mm being tangential to the rounded portion 32 and to the radial rectilinear profile of the load flank 10.

The double rounded portions 32+33 minimize stress concentrations at the foot of the load flank 10.

Opposite to the load flank 5, the axial rectilinear profile of the female thread crest 8 connects via a large radius of curvature convex rounded portion 35 to the stabbing flank constituted by a straight segment 36 with the same inclination as the segment 31. Opposite to the rounded portion 35, the segment 36 is tangential to a convex rounded portion 37 with a low radius of curvature which is itself tangential to a concave rounded portion 38, also with a low radius of curvature, the common tangent of the rounded portions 37 and 38 forming a zone of inflexion being inclined in the same direction as segments 31 and 36 and forming an angle of 70° with the axis. The rounded portion 38 is followed by two other concave rounded portions 39 and 40 the radii of curvature of which are more than and less than 1 mm respectively, the rounded portion 40 connecting to the load flank 5. The common tangent to the rounded portions 38 and 39 is orientated axially and defines the female thread root.

The set of rounded portions 37, 38, 39, 40 constitutes a kind of groove. The double rounded portions 39-40 minimize the stress concentrations at the foot of the load flank 5.

The zone of inflexion between the rounded portions 37, 38 constitutes one of the walls of said groove; the other wall is constituted by the load flank 5.

When threadings 3b and 4b are made up into each other, in addition to axial bearing between load flanks 5, 10 and between stabbing flanks 31, 36, radial interference is obtained between the stabbing flanks defined by the inclined segments 31 and 36, which are at a radial distance from the envelope E of the male thread root, producing the advantages described with respect to FIG. 1.

The embodiment shown in FIG. 3 has a certain number of advantages:

a) the pre-stress generated by the threads bearing both on the load flanks and on the stabbing flanks reduces the geometrical stress concentration factor at the thread root;

b) bearing at the stabbing flanks 31, 36 eases any possible axial abutment (shown in FIG. 7) under axial compression and bending loads.

c) The angle of 27° with respect to the axis of the stabbing flanks 31, 36 (i. e. an angle of 63° with respect to the normal to the axis) can minimize the torque generated by axial bearing of said flanks with respect to that generated by radial interference.

An angle for the stabbing flank with respect to the axis of more than 40° renders the contribution of axial bearing on the makeup torque preponderate and prejudicial. That angle is preferably kept below 30°.

Further, too great an angle requires a substantial reduction in the tolerances on the thread width, which is detrimental to production costs for the threadings. Similarly, a sufficiently small angle produces a certain flexibility in the thread crest, which distributes the load over the load flank better.

A stabbing flank angle of less than 20° with respect to the axis, in contrast, results in too much axial hindrance in the threads.

Modifications can be made to the embodiments described and shown without departing from the scope of the invention. Thus, the two ribs 14 in FIG. 1 can be replaced by a single rib or by three or more ribs. The crest of the ribs, instead of being a point in axial cross section, can have a certain extent in the axial direction, resulting in a contact surface and not in contact line with the female thread crest.

Figure 4:
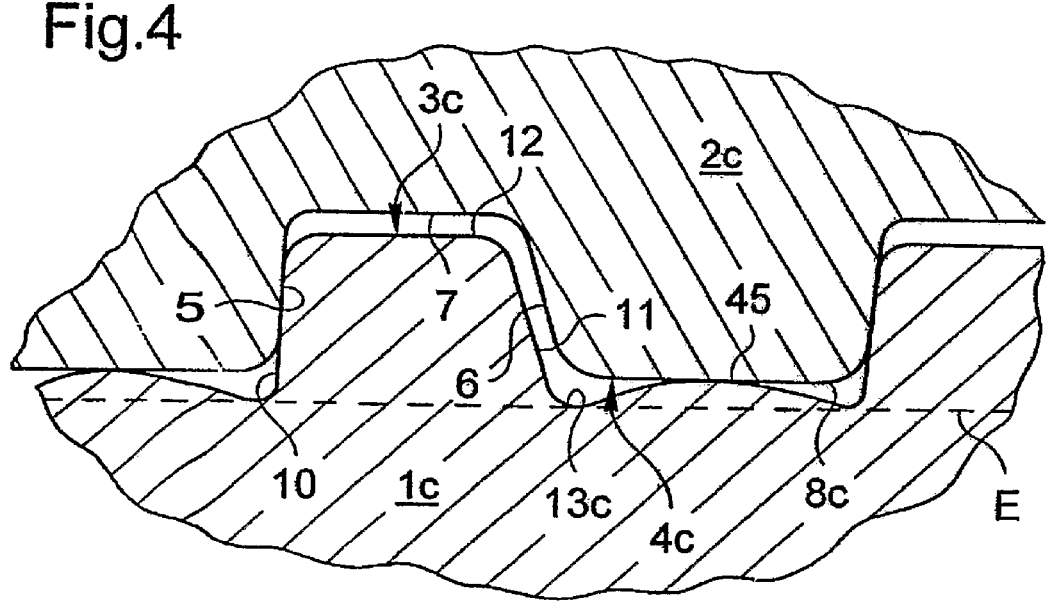

In the embodiment shown in FIG. 4, elements 1c, 2c, 3c, 4c and 8c correspond to elements 1, 2, 3, 4 and 8 of FIG. 1. The ribs 14 are replaced by a boss 45 which extends between the foot of the male load flank 10 and the foot of the male stabbing flank 11 and which connects with the male thread root 13c.

Figure 5:
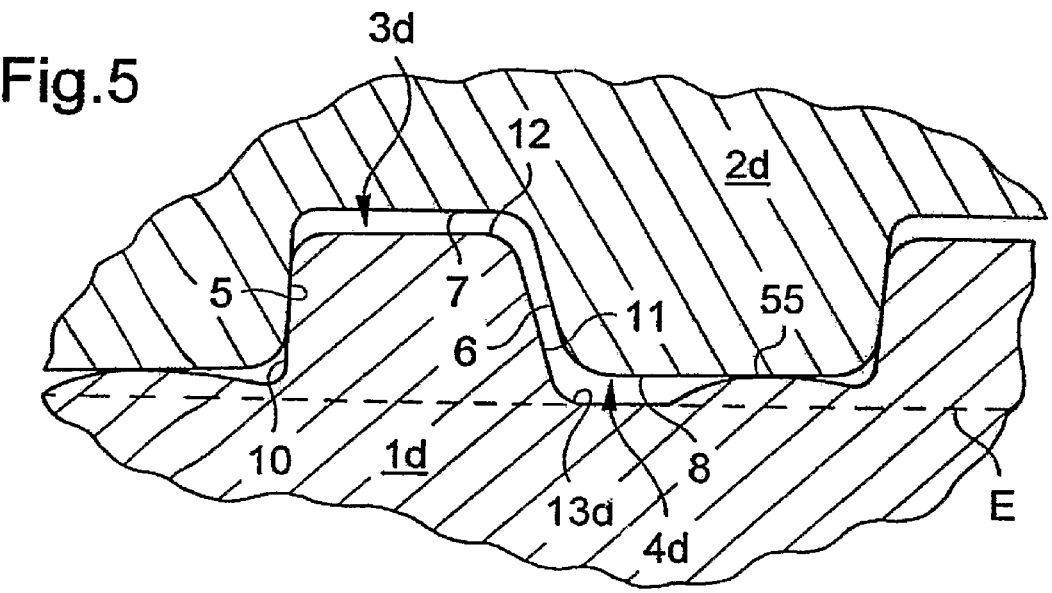

In the embodiment shown in FIG. 5, elements 1d, 2d, 3d and 4d correspond to elements 1, 2, 3 and 4 of FIG. 1. A boss 55 is connected on one side to the male load flank 5 and bears against it, and on the other side to the male thread root 13d.

Figure 6:
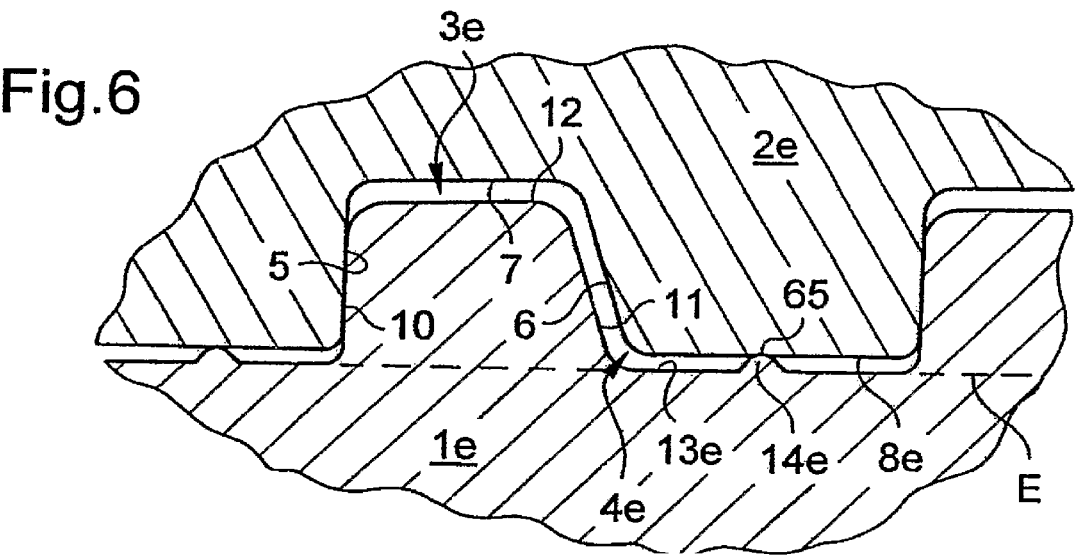

In the embodiment shown in FIG. 6, elements 3e, 4e and 65 correspond to elements 3d, 4d and 55 of FIG. 5. A rib 14e is pre-sent on the male thread root 13e and the female thread crest 8e has a recessed helix partially enveloping the rib 14e after making up the tubular elements 1e, 2e such that a radial clearance exists between the remaining portions of the female thread crest and the male thread root.

In the embodiment shown in FIG. 2, the intermediate regions 22 and 26 of the stabbing flanks are not necessarily orientated axially, but can be slightly inclined with respect to the axis.

In the embodiments shown in FIGS. 1, 2, and 4 to 6, the angle of the load flank can be slightly negative as described, for example, in International patent application WO-A-84/04352 or in the VAM TOP threaded connection sold by the Applicant (catalogue n° 940, publication date July 1994).

The angle of the stabbing flank can be less than 10° or more than 10°.

Figure 7:
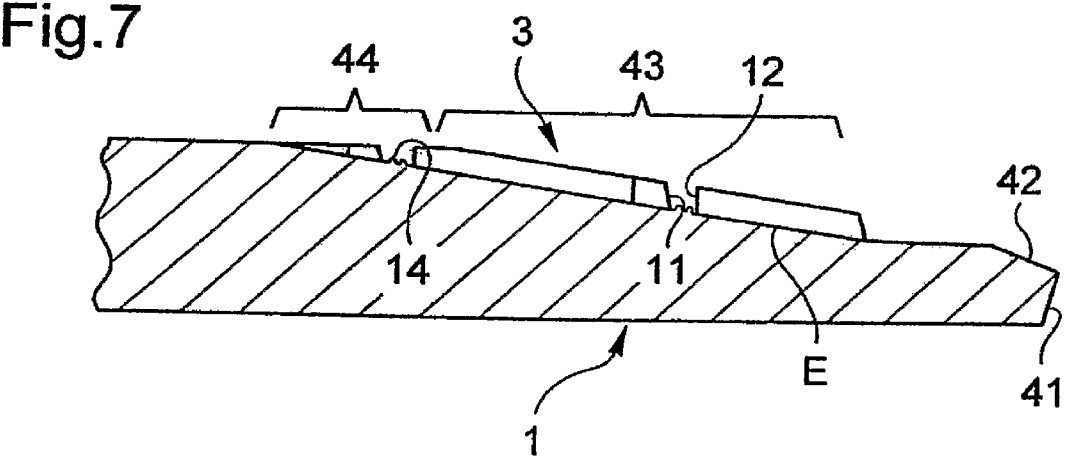
FIG. 7 shows an application of the threads of FIG. 1 on a male tubular element.

FIG. 7 shows the application of the invention as shown in FIG. 1 to a threaded connection the male threading 3 of which includes a portion with perfect threads 43 of full height and similar to those shown in FIG. 1 and a portion of run-out threads 44 of truncated height which progressively reduce from the full height at the junction with the portion 43 to zero when the envelope line E of the thread roots reaches the outer surface of the tube where the male threaded element is formed.

The ribs 14 at the male thread root can advantageously be implanted both in the perfect thread zone 43 and in the run-out thread zone 44.

The embodiment of FIG. 7 can also be applied to the threadings of FIGS. 2 to 6.

The invention can be applied to many types of radially interfering threads, with a single threaded portion or with a plurality of axially distinct threaded portions disposed on the same tapered surface or on a plurality of radially distinct tapered surfaces.

The taper of the threadings can vary widely, for example between 5% and 20%.

The thread roots and/or crests can be parallel to the axis of the connection instead of being disposed on cones, but the threadings will nevertheless retain a generally tapered disposition.

The female tubular element can be disposed at the end of a great length tube the other end of which comprises a male tubular element; the connections are then said to be integral.

The female tubular element can be disposed at the end of a coupling provided with two female tubular elements to constitute a threaded and coupled connection with the male tubular elements disposed at the end of great length tubes.

The threaded connection can also comprise known means for axial positioning (abutment 41) and known sealing means 42.

The invention claimed is:

1. A threaded tubular connection, comprising:
a male tubular element including a tapered male threading, and
a female tubular element including a tapered female threading that cooperates with the male threading by makeup to produce a rigid mutual connection of the male and female tubular elements with radial interference between radial load transfer zones of the male and female threadings,
wherein the male and female threadings each have a load flank extending substantially perpendicularly to an axis of the male and female threadings, and wherein the radial load transfer zones are at a radial distance from envelopes of thread roots of the male and female threadings and form an angle of less than 40° with the axis of the male and female threadings,
wherein the radial load transfer zones are ramps constituting stabbing flanks of the male and female threadings over a major portion of a radial height thereof,
wherein a profile of the male threading includes a first concave rounded portion defining the thread root and tangential to the ramp, and
wherein the profile of the male threading includes a second concave rounded portion with a smaller radius of curvature than the first rounded portion and tangential thereto and to the load flank.

2. A threaded tubular connection according to claim 1, wherein an angle between the ramps and the axis of the threadings is in a range of 20° to 40°.

3. A threaded tubular connection according to claim 1, wherein an angle between the ramps and the axis of the threadings is about 27°.

4. A threaded tubular connection according to claim 1, wherein a groove defining the female thread root extends axially from a first wall constituted by the load flank to a second wall connected to the ramp of the female threading.

5. A threaded tubular connection according to claim 4, wherein a profile of the groove includes a central concave rounded portion framed by first and second rounded concave portions respectively tangential to the first and second walls and with a smaller radius of curvature than the central rounded portion.

6. A threaded tubular connection according to claim 4, wherein a profile of the female threading includes a convex rounded portion tangential to a second rounded portion and to the ramp, a zone of inflexion between the convex rounded portion and the second rounded portion constituting the second wall.

7. A threaded tubular connection according to claim 1, wherein the radial load transfer zones are provided in a zone of full height threads or of threads termed perfect threads.

8. A threaded tubular connection according to claim 7, wherein the radial load transfer zones are also provided in a zone of imperfect threads, or in a zone of run-out threads.

9. A threaded tubular connection according to claim 1, wherein the load flanks of the male and female threadings are in contact on at least two consecutive threads.

10. A pipe string component that connects an offshore platform with a sea bed that includes a threaded tubular connection according to claim 1.

11. A threaded tubular connection, comprising:
a male tubular element including a tapered male threading, and
a female tubular element including a tapered female threading that cooperates with the male threading by makeup to produce a rigid mutual connection of the male and female tubular elements with radial interference between radial load transfer zones of the male and female threadings,
wherein the male and female threadings each have a load flank extending substantially perpendicularly to an axis of the male and female threadings, and wherein the radial load transfer zones are at a radial distance from envelopes of thread roots of the male and female threadings and form an angle of less than 40° with the axis of the male and female threadings,
wherein the radial load transfer zones are ramps constituting stabbing flanks of the male and female threadings over a major portion of a radial height thereof,
wherein a groove defining the female thread root extends axially from a first wall constituted by the load flank to a second wall connected to the ramp of the female threading, and wherein a profile of the groove includes a central concave rounded portion framed by first and second rounded concave portions respectively tangential to the first and second walls and with a smaller radius of curvature than the central rounded portion.

12. A threaded tubular connection according to claim 11, wherein an angle between the ramps and the axis of the threadings is in a range of 20° to 40°.

13. A threaded tubular connection according to claim 11, wherein an angle between the ramps and the axis of the threadings is about 27°.

14. A threaded tubular connection according to claim 11, wherein a profile of the female threading includes a convex rounded portion tangential to a second rounded portion and to the ramp, a zone of inflexion between the convex rounded portion and the second rounded portion constituting the second wall.

15. A threaded tubular connection according to claim 11, wherein the radial load transfer zones are provided in a zone of full height threads or of threads termed perfect threads.

16. A threaded tubular connection according to claim 15, wherein the radial load transfer zones are also provided in a zone of imperfect threads, or in a zone of run-out threads.

17. A threaded tubular connection according to claim 11, wherein the load flanks of the male and female threadings are in contact on at least two consecutive threads.

18. A pipe string component that connects an offshore platform with a sea bed that includes a threaded tubular connection according to claim 11.

19. A threaded tubular connection, comprising:
a male tubular element including a tapered male threading, and
a female tubular element including a tapered female threading that cooperates with the male threading by makeup to produce a rigid mutual connection of the male and female tubular elements with radial interference between radial load transfer zones of the male and female threadings,
wherein the male and female threadings each have a load flank extending substantially perpendicularly to an axis of the male and female threadings, and wherein the radial load transfer zones are at a radial distance from envelopes of thread roots of the male and female threadings and form an angle of less than 40° with the axis of the male and female threadings,
wherein the radial load transfer zones are ramps constituting stabbing flanks of the male and female threadings over a major portion of a radial height thereof,
wherein a groove defining the female thread root extends axially from a first wall constituted by the load flank to a second wall connected to the ramp of the female threading, and
wherein a profile of the female threading includes a convex rounded portion tangential to a second rounded portion and to the ramp, a zone of inflexion between the convex rounded portion and the second rounded portion constituting the second wall.

20. A threaded tubular connection according to claim 19, wherein an angle between the ramps and the axis of the threadings is in a range of 20° to 40°.

21. A threaded tubular connection according to claim 19, wherein an angle between the ramps and the axis of the threadings is about 27°.

22. A threaded tubular connection according to claim 19, wherein a profile of the groove includes a central concave rounded portion framed by first and second rounded concave portions respectively tangential to the first and second walls and with a smaller radius of curvature than the central rounded portion.

23. A threaded tubular connection according to claim 19, wherein the radial load transfer zones are provided in a zone of full height threads or of threads termed perfect threads.

24. A threaded tubular connection according to claim 23, wherein the radial load transfer zones are also provided in a zone of imperfect threads, or in a zone of run-out threads.

25. A threaded tubular connection according to claim 19, wherein the load flanks of the male and female threadings are in contact on at least two consecutive threads.

26. A pipe string component that connects an offshore platform with a sea bed that includes a threaded tubular connection according to claim 19.

* * * * *